US006229590B1

(12) United States Patent
Bannai et al.

(10) Patent No.: US 6,229,590 B1
(45) Date of Patent: May 8, 2001

(54) DISPLAY DEVICE

(75) Inventors: Masanori Bannai; Makoto Ohashi, both of Chiba (JP)

(73) Assignee: Futaba denshi kogyo kabushiki kaisha, Chiba (JP)

( * ) Notice: Subject to any disclaimer, the term of this patent is extended or adjusted under 35 U.S.C. 154(b) by 0 days.

(21) Appl. No.: 09/401,355

(22) Filed: Sep. 21, 1999

(30) Foreign Application Priority Data

Sep. 22, 1998 (JP) ........................................ 10-268258

(51) Int. Cl.[7] ........................ G02F 1/1333; G02F 1/1343
(52) U.S. Cl. ............................ 349/142; 349/146; 349/83
(58) Field of Search ................................. 349/146, 142, 349/83; 345/33, 142

(56) References Cited

U.S. PATENT DOCUMENTS 4,136,932 * 1/1979 Krueger et al. ........................ 349/83
4,647,934 * 3/1987 Naqib ..................................... 345/33
4,654,652 * 3/1987 Cerruti ................................... 345/33

FOREIGN PATENT DOCUMENTS

2266224A * 11/1975 (FR) .
362231368A * 11/1975 (JP) .
11249590A * 9/1999 (JP) .

* cited by examiner

*Primary Examiner*—William L. Sikes
*Assistant Examiner*—Julie Ngo
(74) *Attorney, Agent, or Firm*—Rosenman & Colin, LLP

(57) ABSTRACT

A device for displaying desired characters in a different color by selectively combining and illuminating a plurality of display segments is equipped with a display segment group including a first display segment sub-group having four vertical multi-sided display segments and three horizontal multi-sided display segments which are disposed so as to, in conjunction with each other, form a substantially 8 shape, for illuminating a predetermined color, and a second display segment group having four vertical multi-sided display segments and three horizontal multi-sided display segments which are disposed so as to, in conjunction with each other, have a substantially 8 shape, for illuminating a color different from that illuminated by the first display segment group, wherein the horizontal multi-sided display segments of the first and the second display segment groups are narrower than the vertical multi-sided display segments thereof. Accordingly, it is possible to ensure the continuity of the display segments and to display the desired characters or the like in a different color from each other, thereof enhancing the appearance thereof aesthetically.

8 Claims, 2 Drawing Sheets

DISPLAY DEVICE

FIELD OF THE INVENTION

The present invention relates to a device for displaying desired characters in different colors by selectively combining and illuminating a plurality of display segments; and, more particularly, to an improved digital display pattern for use in a display device such as a fluorescent display tube or a liquid crystal display.

BACKGROUND OF THE INVENTION

There is shown in FIG. 1 an arrangement of display segments in a display device described in Japanese Utility Model Laid-Open Publication No. 57-68280.

The display device in FIG. 1 is a gear range indicator of an automatic transmission in a motor vehicle. The gear range indicator is a single display panel 11 including a first display segment to a tenth display segment 12A to 12J, each of which is, independently, arranged in close proximity to each other.

The above-mentioned display segments will now be described in detail. The first display segment 12A is in a substantially rectangular shape with its longer sides being substantially parallel to a vertical axis of a display panel 11 and its lower end being pointed and shaped like a mountain peak, and is disposed in an upper left half of the display panel 11.

The second display segment 12B is co-linear with the first display segment 12A, its upper end being connected to the lower end of the first display segment 12A and disposed in a lower left half of the display panel 11. Again, it is in a substantially rectangular shape with its longer sides being substantially parallel to the vertical axis of the display panel 11 and its upper end being pointed.

The third display segment 12C is arranged in such a way that it has a substantially horse shoe shape or an inverse C shape, one end thereof being connected to an upper right side of the first display segment 12A and the other end connected to a lower right side thereof.

The fourth display segment 12D slantly extends from a substantially middle part of a lower arm of the horse shoe shaped third display segment 12C, downwardly and rightwardly, in such a way that it has a substantially inclined parallelogram shape.

The fifth display segment 12E has a substantially trapezoid shape with the longer sides lying parallel to a horizontal axis of the display panel 11. Further, one side thereof is connected to a lower right side of the second display segment 12B and the opposite side thereof is connected to a lower left side of the fourth display segment 12D.

The sixth display segment 12F is substantially rectangular with its longer sides being substantially parallel to the vertical axis of the display panel 11, extends vertically upward from a location adjacent to a lower right side of the fourth display segment 12D by a same height as the top of the first display segment 12A and hence it is parallel to the first and the second display segments 12A and 12B.

The seventh display segment 12G is disposed at right side of the sixth display segment 12F at a predetermined distance therefrom so as to be parallel to the sixth display segment 12F. Further, it has an identical shape and size as the sixth display segment 12F.

The eighth display segment 12H is disposed so as to have a substantially inclined parallelogram shape with one side thereof being adjacent to an upper top right side of the sixth display segment 12F and the opposite side thereof being adjacent to a lower bottom left side of the seventh display segment 12G.

The ninth display segment 12I is disposed so as to have a substantially arc shape, wherein the arc rightwardly extends from a location in vicinity of a left top side of the eighth display segment 12H for a predetermined distance and then is downwardly bent to terminate at a location in vicinity of a right top side of the eighth display segment 12H.

The tenth display segment 12J is disposed so as to have a substantially arc shape, wherein the arc rightwardly extends from a location in vicinity of a lower right side of the sixth display segment 12F for a predetermined distance and then is upwardly bent to terminate at a lower right side of the eighth display segment 12H.

The display panel having the display segments 12A to 12J arranged in the foregoing manner indicates the gear ranges of an automatic transmission with the following characters, e.g., "P" for park, "R" for reverse, "N" for neutral, "D" for drive, "2" for second, "L" for low, by selectively combining the display segments 12A to 12J.

To be more specific, the characters above can be indicated on the display device using the following: "P" by selecting the first to the third display segments 12A to 12C; "R" by selecting the first to the fourth display segments 12A to 12D; "N" by selecting the sixth to the eighth display segments 12F to 12H; "D" by selecting the six, the ninth and the tenth display segments 12F, 12I, 12J; "2" by selecting the second, the third and the fifth display segments 12B, 12C, 12E; and "L" by selecting the first, the second and the fifth display segments 12A, 12B, 12E.

Each of the first to the third display segments 12A, 12B, 12C used for indicating "P" on the display device is divided into a plurality of sub-segments 13, each of which is composed of a hatched sub-segment 13*a* and an unhatched sub-segment 13*b*. Again, each of the sub-segments has a substantially inclined rectangular shape. In FIG. 1, the hatched first sub-segments 13*a* and the fourth display segment 12D are different from other display segments 12E to 12J in terms of the color they provide. For example, if the fifth to the tenth display segments 12E to 12J provide a green color, then the hatched first sub-segments 13*a* and the fourth display segment 12D provide a red color.

Further, the unhatched sub-segments 13*b* of the first, the second and the third display segments 12A, 12B, 12C in FIG. 1 are the segments for providing the identical display color, e.g, green, as the fifth to the tenth display segments 12E to 12J.

In such an arrangement as the one described above, "P" is displayed in red when a display signal is applied on the unhatched sub-segments 13*b* of the first to the third display segments 12A to 12C, thereby making it distingshable over the other characters.

In such a conventional display device shown in FIG. 1, by virtue of each of the first to the third display segments 12A to 12C having the plurality of hatched sub-segments 13*a* and the unhatched sub-segments 13*b* alternatively disposed, the hatched sub-segments 13*a* and the unhatched sub-segments 13B providing different display colors from each other, it is possible to display "P" and "R" in different display colors from each other. Furthermore, although the above discussions have been presented referring to a situation where each of the first to the third display segments includes a plurality of rectangular sub-segments for providing different colors, identical results can be obtained by using display segments provided with a plurality of sub-segments shaped like the teeth of a comb or made up of dots.

However, there are a number of major shortcomings associated with the above described display panel: for instance, in displaying the desired characters or the like in different colors from each other, all of the segment arrangements described above include portions thereof which are not illuminated, making the displayed characters appear segmented or discontinuous, aesthetically degrading the appearance thereof.

SUMMARY OF THE INVENTION

It is, therefore, a primary object of the present invention to provide a display device capable of displaying desired characters or the like which, when displayed, appear to look continuous, thereby enhancing the appearance thereof aesthetically.

In accordance with one aspect of the present invention, there is provided a device for displaying desired characters in different colors by selectively combining and illuminating a plurality of display segments, the device comprising: a first display segment group including four vertical multisided display segments and three horizontal multi-sided display segments which are disposed so as to, in conjunction with each other, form a substantially 8 shape, for illuminating a predetermined color, and a second display segment group including four vertical multi-sided display segments and three horizontal multi-sided display segments which are disposed so as to, in conjunction with each other, form a substantially 8 shape, for illuminating a color different from that illuminated by the first display segment group, wherein the first and the second display segment groups are slantly disposed in close vicinity to each other in such a way that the horizontal multi-sided display segments are narrower than the vertical multi-sided display segments, the upper and the lower vertical multi-sided display segments at any one side of the first display segment group are, respectively, surrounded by their corresponding four display segments of the second display segment group disposed in a substantially rectangular shape, and the upper and the lower vertical multi-sided display segments at any one side of the second display segment group are, respectively, surrounded by their corresponding four display segments of the first display segment group disposed in a substantially rectangular shape.

BRIEF DESCRIPTION OF THE DRAWINGS

The above and other objects and features of the present invention will become apparent from the following description of the preferred embodiments given in conjunction with the accompanying drawings, wherein.

DETAILED DESCRIPTION OF THE PREFERRED EMBODIMENTS

Figure 1:
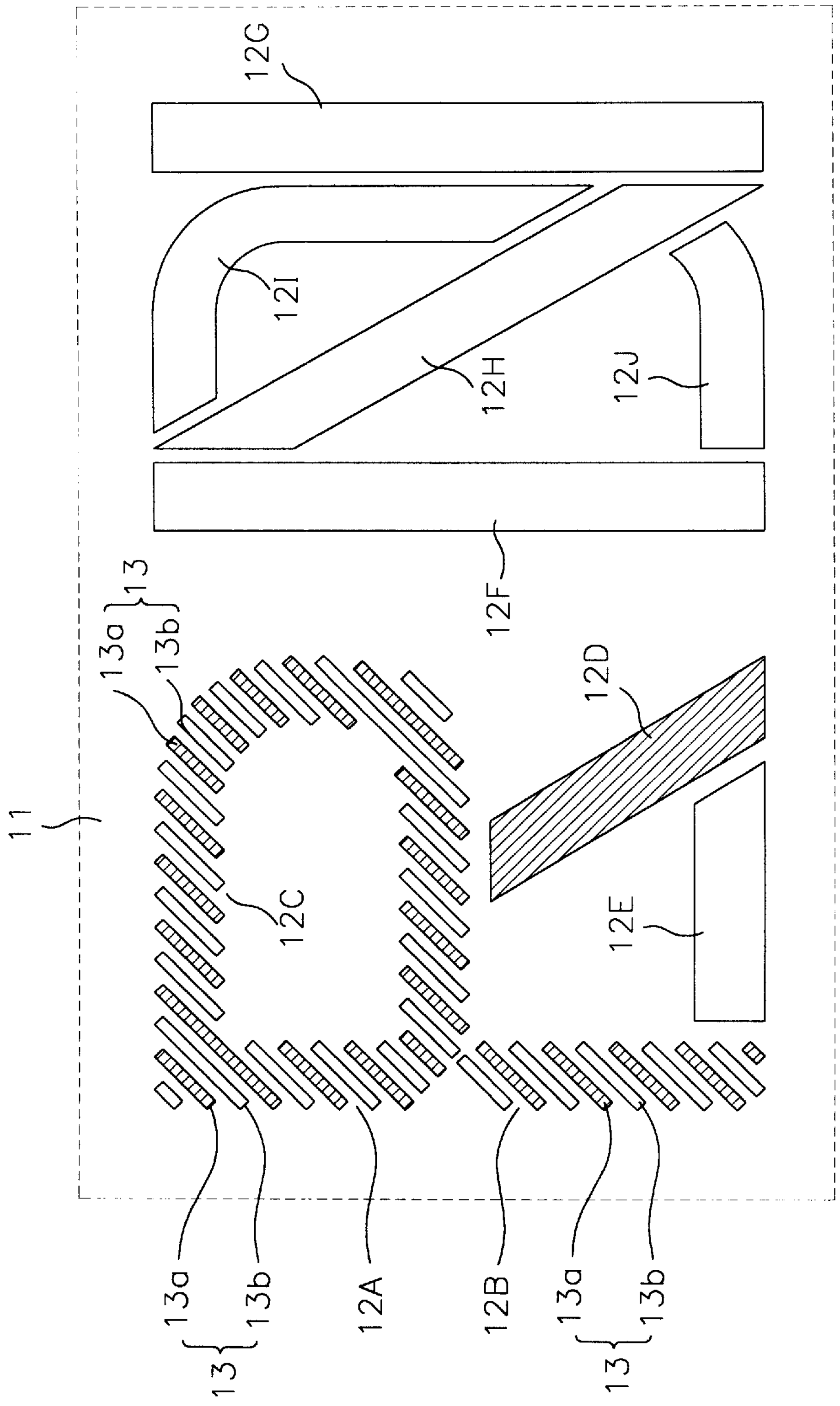
FIG. 1 (PRIOR ART)
FIG. 1 describes an arrangement of segments in a conventional display device.
Figure 2:
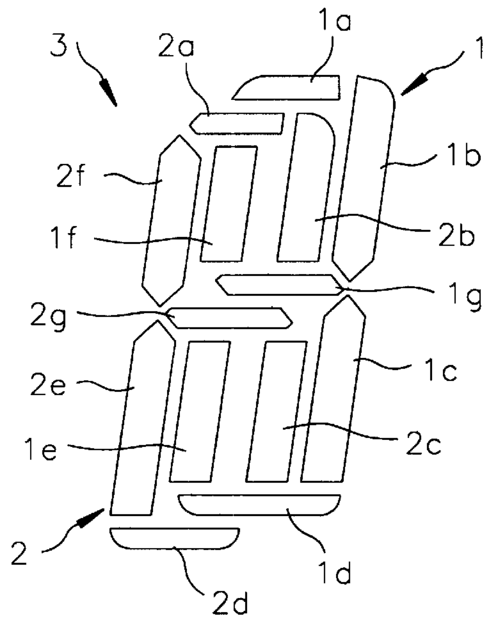
FIG. 2 shows an arrangement of display segments in a display device in accordance with the present invention.

There is shown in FIG. 2 an arrangement of display segments in a display device in accordance with the present invention.

The inventive display device is designed to display desired characters in different colors by selectively combining and illuminating a plurality of display segments. The device includes a display segment group 3 having a first and a second display segment sub-groups 1, 2, wherein each of the sub-groups 1, 2 includes seven display segments disposed on a display panel in such a way that each of the sub-groups 1, 2 has a substantially numeral 8 shape.

The first display segment sub-group 1 includes a first to a fourth display segments 1*f*, 1*e*, 1*b*, 1*c* having a substantially multi-sided shape with longer sides thereof being substantially parallel to a vertical axis of the display panel, and a fifth to a seventh display segments 1*a*, 1*g*, 1*d* having a substantially multi-sided shape with its longer sides thereof being parallel to a horizontal axis of the display panel. The display segments are disposed on the display panel so as to, in conjunction with each other, form the substantially numeral 8 shape.

Similar to the first display segment sub-group 1, the second display segment sub-group 2 includes an eighth to an eleventh display segments 2*f*, 2*e*, 2*b*, 2*c* having a substantially multi-sided shape with longer sides thereof being substantially parallel to the vertical axis of the display panel, and a twelfth to a fourteenth display segments 2*a*, 2*g*, 2*d* having a substantially multi-sided shape with the longer sides thereof being parallel to the horizontal axis of the display panel. The display segments are disposed on the display panel so as to, in conjunction with each other, form the substantially numeral 8 shape.

Hence, hereinafter, the first to fourth display segments of the first display segment sub-group and the eighth to the eleventh display segments of the second display segment subgroup will be referred to as the vertical display segments, and the fifth to the seventh display segments of the first display segment sub-group and the twelfth to the fourteenth display segments of the second display segments sub-group, the horizontal display segments.

The first and the second display segment sub-groups 1, 2 are arranged in close vicinity to each other so as to be slightly inclined to right. The horizontal display segments 1*a*, 1*d*, 1*g*, 2*a*, 2*d*, 2*g* of the first and the second display segment sub-groups 1, 2 have a narrower width and a shorter length than those of the vertical display segments 1*b*, 1*c*, 1*e*, 1*f*, 2*b*, 2*c*, 2*e*, 2*f*.

As a result, the first and the second display segment sub-groups 1, 2 can be disposed on the display panel in a small area by minimizing the distance between the display segments 1*a* to 1*g* and 2*a* to 2*g*.

The arrangement of the first and the second display segment sub-groups 1, 2 constituting the third display segment group 3 will be described with reference to FIG. 2.

As shown, the first and the second display segments if, le having a substantially parallelogram shape and located at a left side of the first display segment sub-group 1 are co-linearly disposed and extend substantially vertically and slightly inclined, so as to form a predetermined angle of inclination with respect to a horizontal axis of the display panel and are separated from each other by a gap, the gap being used to accommodate two horizontal display segments (the sixth and the thirteenth display segments 1*g*, 2*g*).

The third and the fourth display segments 1*b*, 1*c* having a substantially parallelogram shape and located at a right side of the first display segment sub-group 1 are co-linearly disposed, parallel to the first and the second display segments 1*f*, 1*e* and separated from each other by a gap.

The third display segment 1*b* faces the first display segment if, is separated therefrom by a predetermined distance and includes an upper end having a higher vertical position than that of the first display segment 1*f* and a lower end having a substantially identical vertical position as that of the first display segment 1*f*. The upper end of the third display segment 1*b* has an arc shape biased toward a left side thereof and the lower end thereof is shaped like a mountain peak, pointing toward the fourth display segment 1*c*.

The fourth display segment 1*c* faces the second display segment 1*e*, is separated therefrom by a predetermined distance and includes an upper end positioned in close vicinity to the lower end of the third display segment 1*b*, and a lower end having a substantially identical vertical position as that of the second display segment 1*e*. The upper end of the fourth display segment 1*c* shaped like a mountain peak points toward the third display segment 1*b* and the lower end thereof is linear.

The fifth horizontal display segment 1*a* located at an upper portion of the first display segment sub-group 1 includes a left end separated from the upper end of the first display segment 1*f* by a predetermined distance and a right end located in close vicinity to the upper end of the third display segment 1*b*. The left end of the fifth display segment la has an arc shape biased toward the bottom side thereof and the right end thereof is linear.

The sixth horizontal display segment 1*g* located at the middle of the first display segment sub-group 1 is disposed in a parallel to the fifth display segment 1*a* and has a left end positioned in close vicinity to the lower end of the first display segment 1*f* and a right end positioned in close vicinity to the third and the fourth display segments 1*b*, 1*c*. Both ends of the sixth display segment 1*g* are pointed like a mountain peak, respectively.

The seventh horizontal display segment id located at a lower portion of the first display segment sub-group 1 is disposed parallel to both of the fifth and the sixth display segments 1*a*, 1*g* and has a left end positioned in close vicinity to the lower end of the second display segment 1*e* and a right end positioned in close vicinity to the lower end of the fourth display segment 1*c*. Both ends of the seventh display segment 1*d* have an arc shape biased toward the top side thereof, respectively.

The eighth and ninth vertical display segments 2*f*, 2*e* at a left side of the second display segment sub-group 2 are co-linearly disposed, located in close vicinity to, and parallel to the first and the second display segments 1*f*, 1*e* of the first display segment sub-group 1.

The eighth display segment 2*f* facing the first display segment 1*f* includes an upper end having a substantially identical vertical position as that of the upper end of the first display segment 1*f* and a lower end having a lower vertical position than that of the lower end of the first display segment 1*f*. The upper end of the eighth display segment 2*f* is pointed like a mountain peak and the lower end thereof is shaped like a mountain peak, pointing toward the ninth display segment 2*e*.

The ninth display segment 2*e* facing the second display segment 1*e* includes an upper end positioned in close vicinity to the lower end of the eighth display segment 2*f* and a lower end having a lower vertical position than that of the lower end of the second display segment 1*e*. Again, the upper end of the ninth display segment 2*e* is shaped like a mountain peak, pointing toward the eighth display segment 2*f* and the lower end thereof is linear.

The tenth and the eleventh vertical display segments 2*b*, 2*c* at a right side of the second display segment sub-group 2 are, respectively, separated from the eighth and ninth display segments 2*f*, 2*e* by a predetermined distance, run parallel thereto, and are co-linearly disposed in close vicinity to the third and the fourth display segments 1*b*, 1*c* of the first display segment sub-group 1.

The tenth display segment 2*b* is disposed in close vicinity to the third display segment 1*b* between the first display segment 1*f* and the third display segment 1*b*, and includes an upper end having a slightly higher vertical position than that of the upper end of the eighth display segment 2*f* and a lower end having a substantially identical vertical position as that of the lower end of the first display segment 1*f*. The upper end of the tenth display segment 2*b* has an arc shape biased toward the left side thereof and the lower end thereof is linear.

The eleventh display segment 2*c* is disposed in close vicinity to the fourth display segment 1*c* between the second display segment 1*e* and the fourth display segment 1*c*, and includes an upper and a lower ends having substantially identical vertical positions as those of the corresponding upper and lower ends of the second display segment 1*e*, respectively. Both the upper and the lower ends of the eleventh display segment 2*c* are linear.

The twelfth horizontal display segment 2*a* at the upper side of the second display segment sub-group 2 includes a left and a right ends, wherein the left and the right ends are, respectively, positioned at a location adjacent to the upper end of the eighth display segment 2*f* and the upper end of the tenth display segment 2*b* in such a way that the twelfth display segment 2*a* extends between the first and the fifth display segments 1*f*, 1*a*. The left end of the twelfth display segment 2*a* has an arc shaped upper half and an inclined lower half, and the right end thereof is linear.

The thirteenth horizontal display segment 2*g* at the middle of the second display segment sub-group 2 is disposed parallel to the twelfth display segment 2*a*, and includes a left end positioned at a location adjacent to both of the lower ends of the eighth and the ninth display segments 2*f*, 2*e* and a right end positioned at a location adjacent to the eleventh display segments 2*c*. Both ends of the thirteenth display segment 2*g* are pointed.

The fourteenth horizontal display segment 2*d* at a lower side of the second display segment sub-group 2 is disposed parallel to both of the twelfth and the thirteenth display segments 2*a*, 2*g*, and includes a left end positioned at a location adjacent to the lower end of the ninth display segment 2*e* and a right end positioned adjacent to a substantially middle portion of the lower end of the seventh display segment 1*d*. Both ends of the fourteenth display segment 2*d* are arc shaped, biased toward the top side thereof.

In the above illustrated arrangement, the first display segment if of the first display segment sub-group 1 is located inside a substantial rectangle formed by arranging the eighth, the tenth, the twelfth and the thirteenth display segments 2*f*, 2*b*, 2*a*, 2*g* of the second display segment sub-group 2. Similarly, the second display segment 1*e* of the first display segment sub-group 1 is located inside a substantial rectangle formed by arranging the ninth, the eleventh, the thirteenth and the fourteenth display segments 2*e*, 2*c*, 2*g*, 2*d* of the second display segment sub-group 2.

The tenth display segment 2*b* of the second display segment sub-group 2 is located inside a substantial rectangle formed by arranging the first, the third, the fifth and the sixth display segments 1*f*, 1*b*, 1*a*, 1*g* of the first display segment sub-group 1. The eleventh display segment 2*c* is located inside a substantial rectangle formed by arranging the second, the fourth, the sixth and the seventh display segments 1*e*, 1*c*, 1*g*, 1*d* of the first display segment sub-group 2.

As a result, the first and the second display segment sub-groups 1, 2 are slightly inclined to right and the display segments thereof are disposed in close vicinity to each other.

The display segments 1*a* to 1*g* of the first display segment sub-group 1 and the display segments 2*a* to 2*g* of the second display segment sub-group 2 may be employed in a fluorescent display tube or a liquid crystal display, an electroluminescence, a plasma display, etc.

When the display device receives a display signal through an outside lead line (not shown), the display segments 1*a* to 1*g* of the first display segment sub-group 1 are, respectively, driven to be illuminated in a preassigned display color, e.g., green, while the display segments 2*a* to 2*g* of the second display segment sub-group 2 are, respectively, driven to be illuminated in a different display color from the display segments of the first segment sub-group 1, e.g., red.

Figure 3A:
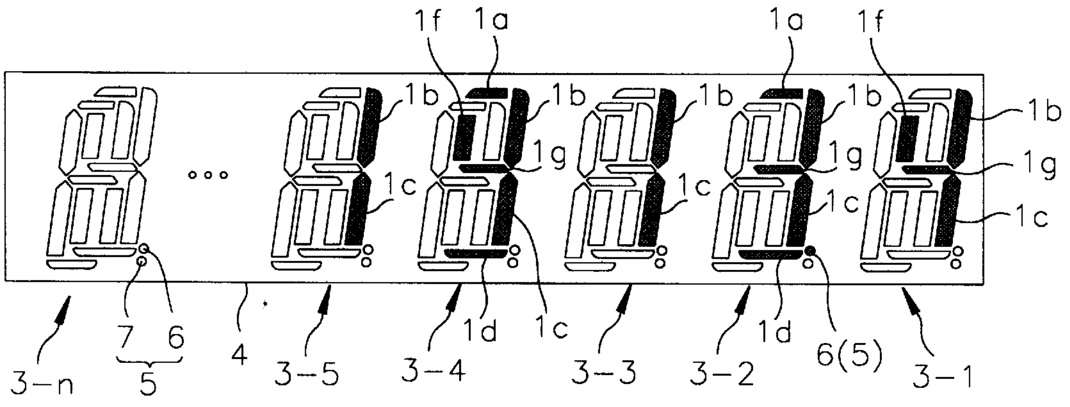
FIGS. 3A and 3B illustrate an exemplary display of the segments in FIG. 2, respectively, when they are employed in a display panel of a computer.
Figure 3B:
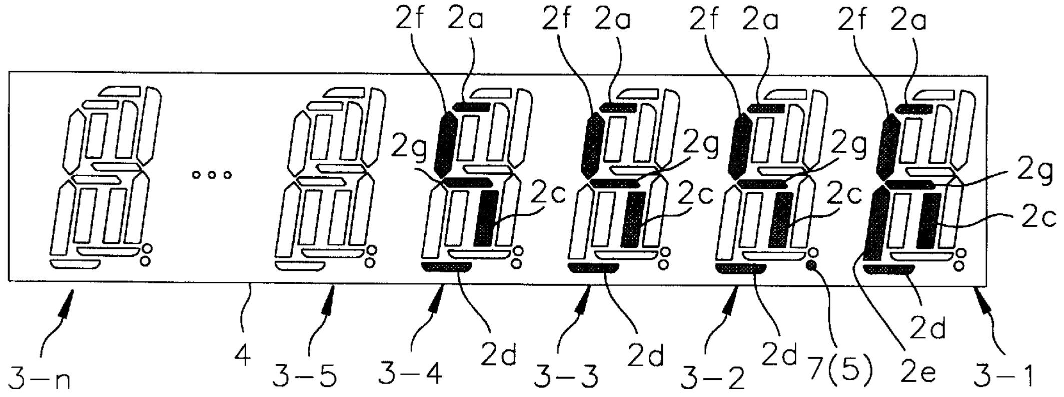

There are shown in FIGS. 3A and 3B an exemplary display of the display segments in FIG. 2, when they are incorporated in the display panel of a computer.

The computer in FIGS. 3A and 3B includes a display panel 4 in which n number of display segment groups 3 shown in FIG. 2 (for example, n can be 8, 11, 13 etc) are displaced so as to be separated from each other by a predetermined distance. Furthermore, the display panel 4 includes circular dot segment groups 5 to represent decimal points, each of the circular dot segment groups being located between two successive display segment groups.

Each of the dot segment groups 5 includes a first dot segment 6 for the first display segment sub-group 1 of the display segment group 3 and a second dot segment 7 for the second display segment sub-group 2 thereof.

To be more specific, each of the first dot segments 6 is disposed near a lower right end of the fourth display segment lc of its corresponding first display segment sub-group 1. When a display signal is applied onto the first dot segments 6 through an outside lead line (not shown), the first dot segments 6 are driven to be illuminated in green identical to the display color of the first display segment sub-groups 1.

Each of the second dot segments 7 is disposed below a right end of the seventh display segment 1*d* of its corresponding first display segment sub-group 1 so as to be in close vicinity to the first dot segment 6. When the display signal is applied onto the second dot segments 7 through an outside lead line (not shown), the second dot segments 7 are driven to be illuminated in a color identical to the display color of the second display segment sub-groups 2, i.e., red.

In calculation operation of the computer having the display panel 4 arranged as mentioned above, some of the first display segments of the first display segment sub-group 1 are driven to be illuminated when a positive value results, and some second display segments of the second display segment sub-groups 2 are driven to be illuminated when a negative value results.

FIGS. 3A and 3B illustrate a result of calculating "1234.5+678.9" and a result of calculating "678.9−1234.5", respectively.

As shown in FIG. 3A, since the result of calculating "1234.5+678.9" is a positive value, i.e., "1913.4", the value is displayed in green on the display panel using the first display segment sub-groups 1.

To be more specific, in displaying the value the first, the third, the fourth and the sixth display segments 1*f*, 1*b*, 1*c*, 1*g* of the first display segment sub-group 1 receive the display signal, which, in turn, allows the display segment group 3-1 to illuminate the number at the far right end of the value in green. As a result, "4" in green is displayed at the right end of the display panel 4.

The third to the seventh display segments 1*b*, 1*c*, 1*a*, 1*g*, 1*d* of the first display segment sub-group 1 receive the display signal, which, in turn, allows the display segment group 3-2 to illuminate the second last number from the far right end of the value in green. As a result, "3" in green is displayed as the second last number on the display panel 4.

The first dot segment 6 receives the display signal, which, in turn, allows the dot segment group 5-1 between the last number on the right and the second last number to be illuminated in green. Accordingly, the dot for indicating the decimal point is displayed in green between the last number on the right and the second last number.

The third and the fourth display segments 1*b*, 1*c* of the first display segment sub-group 1 receive the display signal, which, in turn, allows the display segment group 3-3 to illuminate the third number from the far right end of the value in green. Accordingly, "1" in green is displayed as the third last number on the display panel 4.

The first, the third to the seventh display segments 1*f*, 1*b*, 1*c*, 1*a*, 1*g*, 1*d* of the first display segment sub-group 1 receive the display signal, which, in turn, allows the display segment group 3-4 to illuminate the fourth number from the far right end of the value in green. Accordingly, "9" is displayed as the fourth last number from the right on the display panel 4 in green.

The third and the fourth display segments 1*b*, 1*c* of the first display segment sub-group 1 receive the display signal, which, in turn, allows the display segment group 3-5 to illuminate the first number of the value on the display panel 4 in green. Accordingly, "1" in green is displayed as the first number of the value on the display panel 4.

As shown in FIG. 3B, since the result of calculating "678.9−1234.5" is a negative value, i.e., −555.6, the value "555.6" is displayed in red by the second display segment sub-groups 2.

To be more specific, the eighth, the ninth, the eleventh to the fourth display segments 2*f*, 2*e*, 2*c*, 2*a*, 2*g*, 2*d* of the second display segment sub-group 2 receive the display signal, which, in turn, allows the display segment group 3-1 to illuminate the number at the far right end of the value in red. Accordingly, "6" in red is displayed as the first number from the far right end of the display panel 4.

The eighth, the eleventh to the fourteenth display segments 2*f*, 2*c*, 2*a*, 2*g*, 2*d* of the second display segment subgroup 2 receive the display signal, which, in turn, allows the display segment group 3-2 to illuminate the second number from the far right end of the value in red. As a result, "5" in red is displayed as the second last number on the display panel 4.

The second dot segment 7 receives the display signal, which, in turn, allows the dot segment group 5-1 between the last number on the right and the second last number therefrom to be illuminated in red. Accordingly, the dot for indicating the decimal point is displayed between the last number on the right and the second last number in red.

The eighth, the eleventh to fourteenth display segments 2*f*, 2*c*, 2*a*, 2*g*, 2*d* of the second display segment sub-group 2 receive the display signal, which, in turn, allows the display segment group 3-3 to illuminate the third number from the far right end of the value in red. Accordingly, "5" in red is displayed as the third last number on the display panel 4.

The eighth, the eleventh to fourteenth display segments 2*f*, 2*c*, 2*a*, 2*g*, 2*d* of the second display segment sub-group 2 receive the display signal, which, in turn, allows the display segment group 3-4 to illuminate the fourth number from the far right end of the value in red. Accordingly, "5" in red is displayed as the fourth last number on the display panel 4.

In such an inventive display device, a display segment group 3 for displaying a number is composed of fourteenth display segments 1*a* to 1*g* and 2*a* to 2*g*, the first to the seventh display segments 1*f*, 1*e*, 1*b*, 1*c*, 1*a*, 1*g*, 1*d* constituting one of the two substantially 8 shaped segments (the first display segment sub-group 1), the eighth to the fourteenth display segments 2*f*, 2*e*, 2*b*, 2*c*, 2*a*, 2*g*, 2*d* constituting the other substantially 8 shaped segment (the second display segment sub-group 2). Further, the two substantially 8 shaped segments are slightly slanted and arranged in close vicinity to each other but not overlapping each other.

Accordingly, comparing with the conventional display device wherein one display segment divided into the plurality of sub-segments, in the present invention, the display segments are arranged in close vicinity to each other, allowing the display device to digitally display, in a different color from each other, the desired characters or the like which appear to look continuous, enhancing the appearance thereof aesthetically.

In addition, the horizontal display segments 1*a*, 1*d*, 1*g*, 2*a*, 2*d*, 2*g* of the first and the second display segment subgroups 1, 2 have a narrower width and a shorter length than those of the vertical display segments 1*b*, 1*c*, 1*e*, 1*f*, 2*b*, 2*c*, 2*e*, 2*f* thereof.

Consequently, the distances among the display segments 1*a* to 1*g* and 2*a* to 2*g* can be minimized, which, in turn, allows the display segment group 3 to be accommodated in a smaller area in the display panel.

Further, the segment arrangement in accordance with the present invention can be employed in a the display panel of a computer as well as display panels of a watch, a temperature gauge, an audio machinery, a measuring machinery or the like.

It should be noted that although the above discussions have been presented referring to a situation where each of the display segments 1*a* to 1*g* of the first display segment subgroup 1 is illuminated in green and each of the display segments 2*a* to 2*g* of the second display segment sub-group 2 is illuminated in red, the display colors illuminated by the display segments are not limited to green and red. In other words, each of the display segments 1*a* to 1*g* of the first display segment sub-group 1 and each of the display segments 2*a* to 2*g* of the second display segment sub-group 2 can be illuminated in various different colors with the only requirement that they be different from each other, e.g., blue and yellow, green and blue, etc.

Further, it should be noted that although the above discussions have been made with reference to a situation where the first and the second display segment sub-groups 1, 2 are disposed so as to be inclined in one direction, i.e., to the right in close vicinity to each other, they may be inclined in an opposite direction, i.e., to the left.

In such a display device, since the continuity of the display segments is ensured, it is possible to display desired characters or the like in a different color from each other, enhancing the appearance thereof aesthetically. Further, since the horizontal display segments of the first and the second display segment groups have a narrower width and a shorter length than those of the vertical display segments thereof, the distances between the display segments can be minimized, allowing the display segment groups to be arranged on the display panel in a smaller space.

While the present invention has been described with respect to certain preferred embodiments only, other modifications and variations may be made without departing from the scope of the present invention as set forth in the following claims.

What is claimed is:

1. A device for displaying desired characters or the like in different colors by selectively combining and illuminating a plurality of display segments, comprising:

a first display segment group including four vertical display segments and three horizontal display segments which are disposed so as to, in conjunction with each other, form a substantially 8 shape, for illuminating a predetermined color; and a second display segment group including four vertical display segments and three horizontal display segments which are disposed so as to, in conjunction with each other, form a substantially 8 shape, for illuminating a color different from that illuminated by the first display segment group, wherein the first and the second display segment groups are slantly disposed in close vicinity to each other in such a way that the horizontal display segments are narrower than the vertical display segments, the upper and the lower vertical display segments at any one side of the first display segment group are, respectively, surrounded by their corresponding four display segments of the second display segment group disposed in a substantially rectangular shape, and the upper and the lower vertical display segments at any one side of the second display segment group are, respectively, surrounded by their corresponding four display segments of the first display segment group disposed in a substantially rectangular shape.

2. A device for displaying desired characters or the like in different colors by selectively combining and illuminating a plurality of display segments, comprising:

a first display segment group including four vertical display segments and three horizontal display segments which are disposed so as to, in conjunction with each other, form a substantially 8 shape, for illuminating a predetermined color; and a second display segment group including four vertical display segments and three horizontal display segments which are disposed so as to, in conjunction with each other, form a substantially 8 shape, for illuminating a color different from that illuminated by the first display segment group, wherein the upper and the lower vertical display segments at any one side of the first display segment group are, respectively, surrounded by their corresponding four display segments of the second display segment group disposed in a substantially rectangular shape, and the upper and the lower vertical display segments at any one side of the second display segment group are, respectively, surrounded by their corresponding four display segments of the first display segment group disposed in a substantially rectangular shape.

3. The device of claim 1, wherein each of the vertical and the horizontal display segments of the first and the second segment groups is multi-sided.

4. The device of claim 2, wherein each of the vertical and the horizontal display segments of the first and the second segment groups is multi-sided.

5. The device of claim 3, wherein each of the vertical and the horizontal display segments of the first and the second segment groups has a rectangular shape.

6. The device of claim 4, wherein each of the vertical and the horizontal display segments of the first and the second segment groups has a rectangular shape.

7. The device of claim 3, wherein each of the vertical and the horizontal display segments of the first and the second segment groups has a parallelogramatic shape.

8. The device of claim 4, wherein each of the vertical and the horizontal display segments of the first and the second segment groups has a parallelogramatic shape.

* * * * *